(12) United States Patent
Dudar

(10) Patent No.: US 12,000,744 B2
(45) Date of Patent: Jun. 4, 2024

(54) METHOD AND SYSTEM FOR DIAGNOSING FUEL TANK PRESSURE SENSOR

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 129 days.

(21) Appl. No.: 17/653,698

(22) Filed: Mar. 7, 2022

(65) Prior Publication Data

US 2023/0280229 A1   Sep. 7, 2023

(51) Int. Cl.
| | |
|---|---|
| *G01L 27/00* | (2006.01) |
| *G01L 7/08* | (2006.01) |
| *G01L 7/18* | (2006.01) |
| *G01L 23/04* | (2006.01) |
| *G01L 23/24* | (2006.01) |
| *B60K 15/03* | (2006.01) |

(52) U.S. Cl.
CPC ............ *G01L 27/007* (2013.01); *G01L 7/18* (2013.01); *G01L 23/24* (2013.01); *B60K 2015/0321* (2013.01)

(58) Field of Classification Search
CPC ............ F02D 41/0032; F02D 41/0042; F02D 33/003; F02D 41/003; F02D 41/22; F02D 41/221; F02D 2041/224; F02D 2200/701; F02D 41/0035; F02D 41/004; F02D 41/0045; F02D 41/08; F02D 41/123; F02D 41/1454; F02D 41/1456; F02D 41/18; F02D 41/2451; F02D 41/2464; F02D 41/3082; G01L 1/142; G01L 5/0052; G01L 23/24; G01L 27/007; G01L 7/18

See application file for complete search history.

(56) References Cited

U.S. PATENT DOCUMENTS

| | | | |
|---|---|---|---|
| 8,447,495 B2 | 5/2013 | Pearce et al. | |
| 9,217,397 B2 | 12/2015 | Peters et al. | |
| 9,416,755 B2* | 8/2016 | Dudar | ................... F02D 41/004 |
| 9,523,317 B1 | 12/2016 | Li | |
| 9,739,239 B2* | 8/2017 | Dudar | ................ F02M 25/0827 |
| 9,751,396 B2 | 9/2017 | Dudar | |
| 9,797,348 B2* | 10/2017 | Dudar | ................ F02M 25/0809 |
| 9,945,752 B2 | 8/2018 | Dudar | |
| 10,054,070 B2 | 8/2018 | Dudar et al. | |
| 10,100,770 B2 | 10/2018 | Dudar | |

(Continued)

FOREIGN PATENT DOCUMENTS

KR      20020051776 A      6/2002

OTHER PUBLICATIONS

Dudar, A., "Methods and Systems for Determining Integrity of Fuel Tank Pressure Transducer," U.S. Appl. No. 17/454,951, filed Nov. 15, 2021, 53 pages.

*Primary Examiner* — Andre J Allen
(74) *Attorney, Agent, or Firm* — Vincent Mastrogiacomo; McCoy Russell LLP

(57) ABSTRACT

Methods and systems are presented for diagnosing operation of a fuel tank pressure sensor. The methods and systems may include releasing fuel vapors from a fuel tank to an engine when an engine is rotating in a fuel cut out mode while a catalyst temperature is greater than a threshold temperature to determine whether or not the fuel tank pressure sensor is degraded.

20 Claims, 4 Drawing Sheets

(56) References Cited

U.S. PATENT DOCUMENTS

| | | | |
|---|---|---|---|
| 10,385,795 B2 | 8/2019 | Dudar et al. | |
| 10,393,071 B2 * | 8/2019 | Dudar | F02M 25/0854 |
| 10,451,010 B2 | 10/2019 | Dudar | |
| 10,760,532 B1 | 9/2020 | Dudar | |
| 11,148,930 B2 | 10/2021 | Dudar | |
| 11,542,895 B2 * | 1/2023 | Dudar | F02M 25/0854 |
| 11,549,468 B2 * | 1/2023 | Dudar | B01D 53/0415 |
| 2015/0085894 A1 | 3/2015 | Yang et al. | |
| 2020/0102203 A1 | 4/2020 | Dudar | |
| 2020/0182174 A1 * | 6/2020 | Dudar | F02M 25/089 |
| 2023/0014329 A1 * | 1/2023 | Dudar | F02M 25/0836 |

* cited by examiner

METHOD AND SYSTEM FOR DIAGNOSING FUEL TANK PRESSURE SENSOR

FIELD

The present description relates generally to methods and systems for diagnosing operation of a fuel tank pressure sensor.

BACKGROUND/SUMMARY

A vehicle may include a fuel tank for storing liquid fuel. The liquid fuel may change phase into a gas (e.g., fuel vapors) when the liquid fuel is heated and/or agitated. Pressure within the fuel tank may increase when the liquid fuel changes phase into a gas. The pressure in the fuel tank may be relieved by purging the gases from the fuel tank into an engine where the fuel is combusted. Pressure in the fuel tank may be relieved in response to output of a pressure sensor that responds to pressure in the fuel tank. However, it may be possible for a fuel tank pressure sensor to output an in-range fuel tank pressure even though pressure in the fuel tank is out of range. For example, if a reference voltage becomes disconnected from a fuel tank pressure sensor, the fuel tank pressure sensor may output a value that indicates that pressure in the fuel tank is near atmospheric pressure even though pressure in the fuel tank is above atmospheric pressure. A pressure sensor in a fuel tank that outputs a value that is not indicative of pressure in the fuel tank may cause insufficient purging of fuel vapors from the fuel tank. Consequently, evaporative emissions from the vehicle may increase.

The inventor herein has recognized the above-mentioned issue and has developed a vehicle system, comprising: a vehicle including an internal combustion engine and a fuel tank, the internal combustion engine including an oxygen sensor, the fuel tank including a pressure sensor configured to monitor pressure in the fuel tank; and a controller in the vehicle, the controller including executable instructions stored in non-transitory memory that cause the controller to evaluate operation of the pressure sensor based on output of the oxygen sensor.

By evaluating operation of a fuel tank pressure sensor based on output of an oxygen sensor, it may be possible to provide the technical result of diagnosing the fuel tank pressure sensor when output of the fuel tank pressure sensor is within an expected range. In particular, output of an oxygen sensor may be applied to confirm that a fuel tank was pressurized while output of the fuel tank pressure sensor is within an expected range. If the oxygen sensor senses a richer air-fuel mixture after a canister purge valve has been opened while output of the pressure sensor is substantially unchanged, it may be determined that the pressure sensor is degraded even if the output of the pressure sensor is within range. However, if the oxygen sensor senses substantially no change in an air-fuel mixture after the canister purge valve has been opened while output of the pressure sensor is substantially unchanged, it may be determined that the a canister purge valve is degraded or that there may be a breach in an evaporative emissions system.

The present description may provide several advantages. In particular, the approach may determine the presence or absence of degradation of a fuel tank pressure sensor when the fuel tank pressure sensor output is within an expected range. Additionally, the approach may distinguish between canister purge valve degradation and fuel pressure sensor degradation. Further, the approach may reduce emissions of fuel vapors and improve vehicle operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
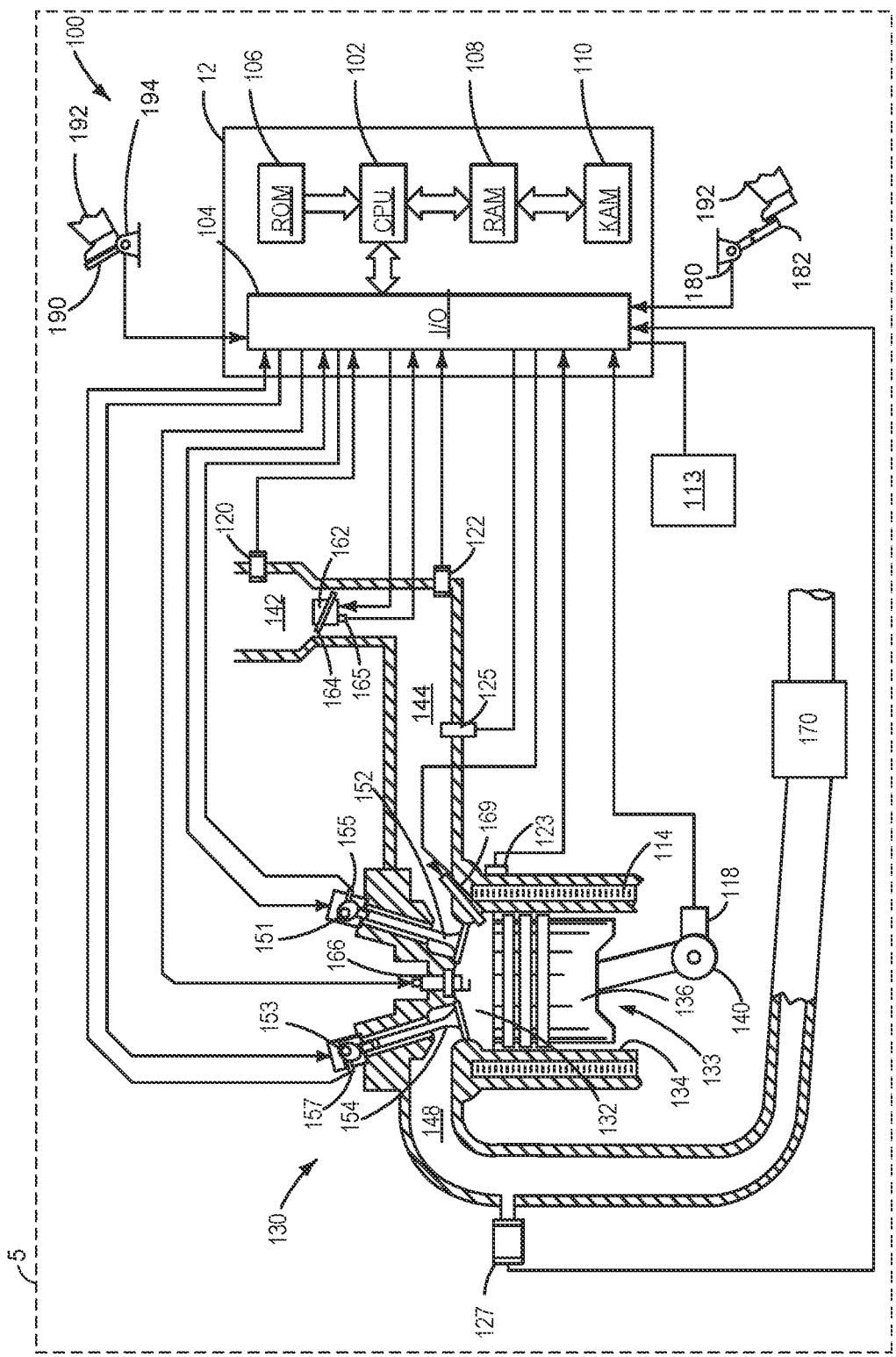
FIG. 1 an example internal combustion engine of a vehicle.
Figure 2:
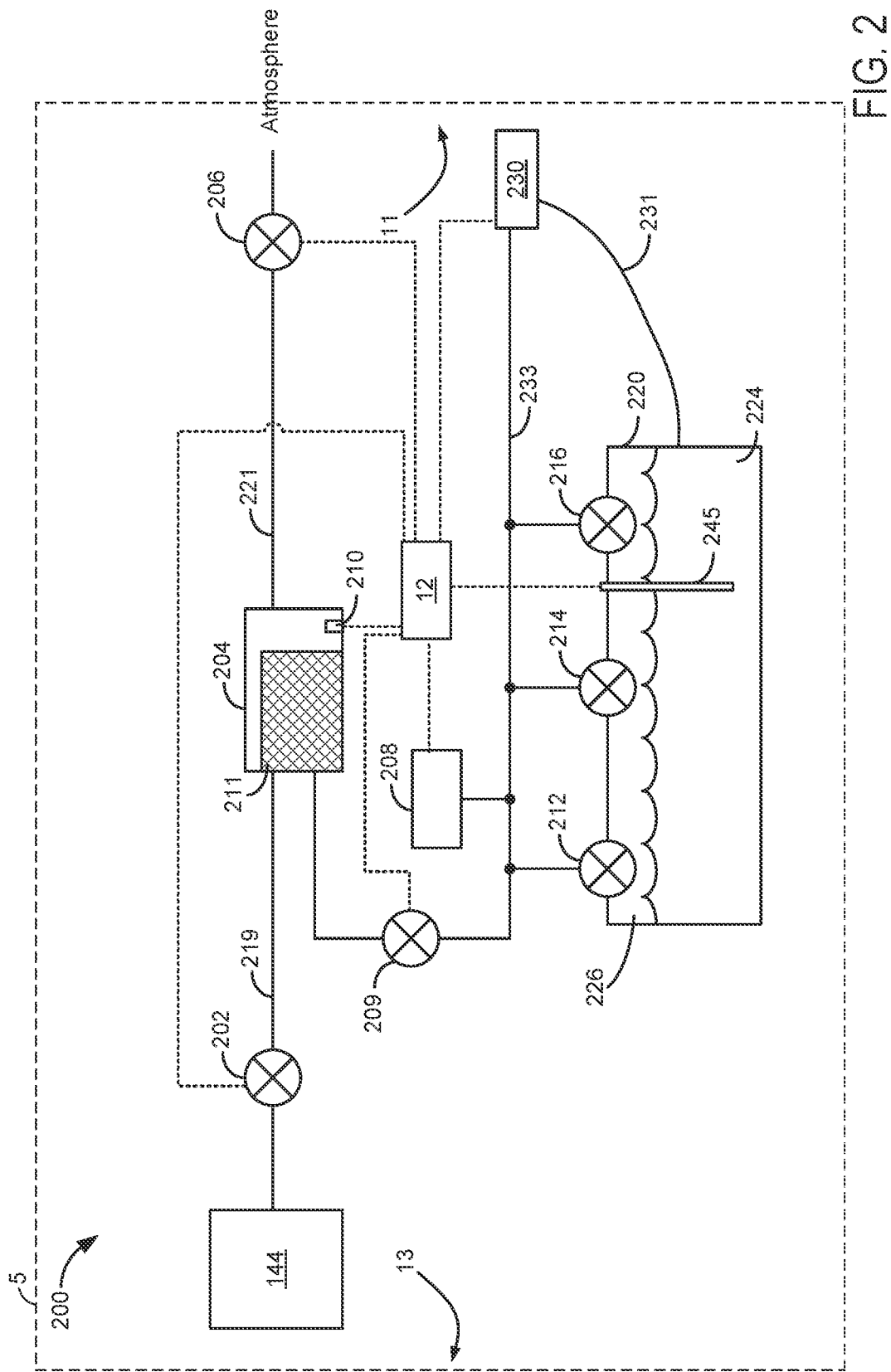
FIG. 2 shows a block diagram of an example evaporative emissions system for the vehicle.
Figure 3:
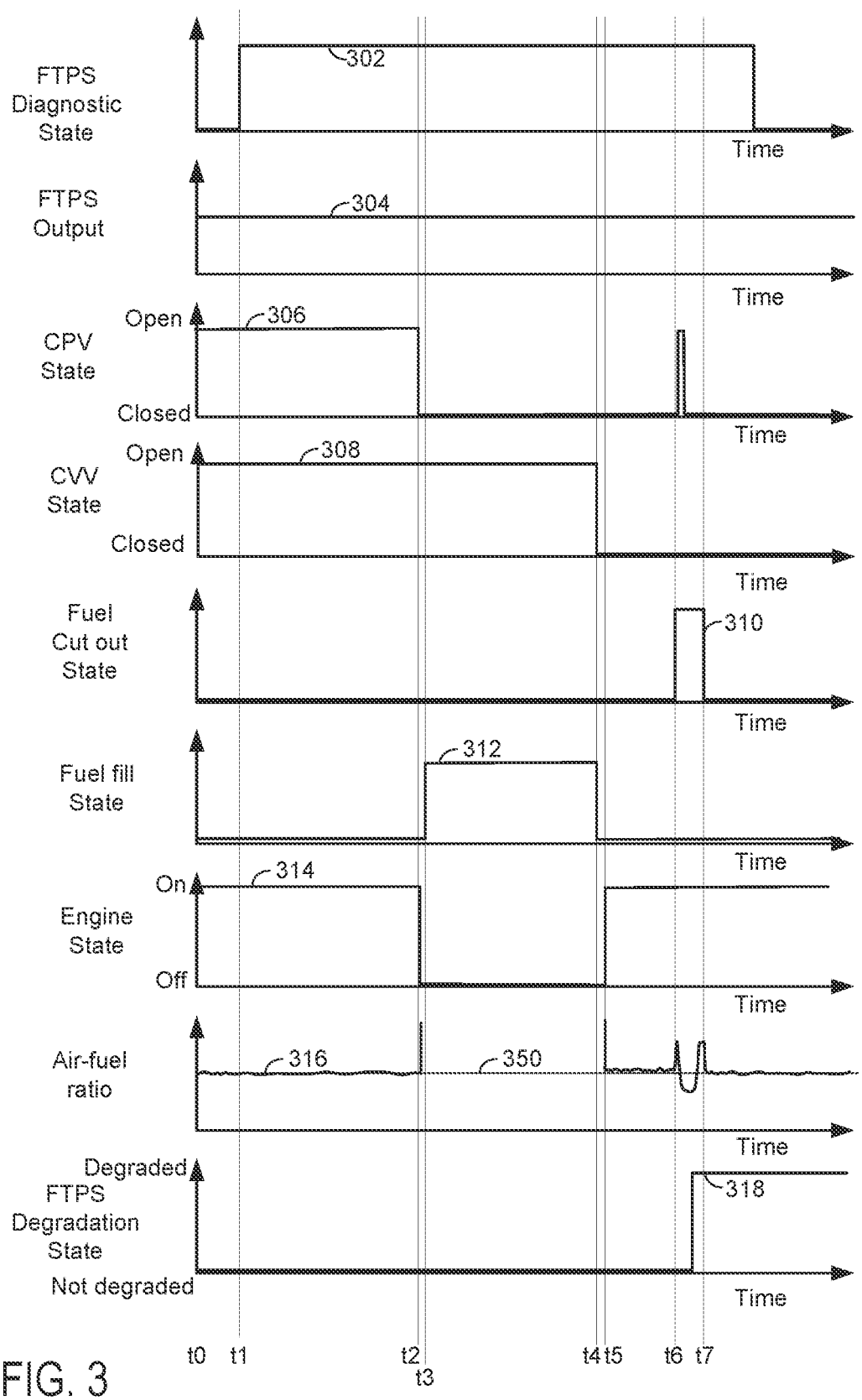
FIG. 3 shows an example vehicle operating sequence according to the method of FIG. 4.
Figure 4:
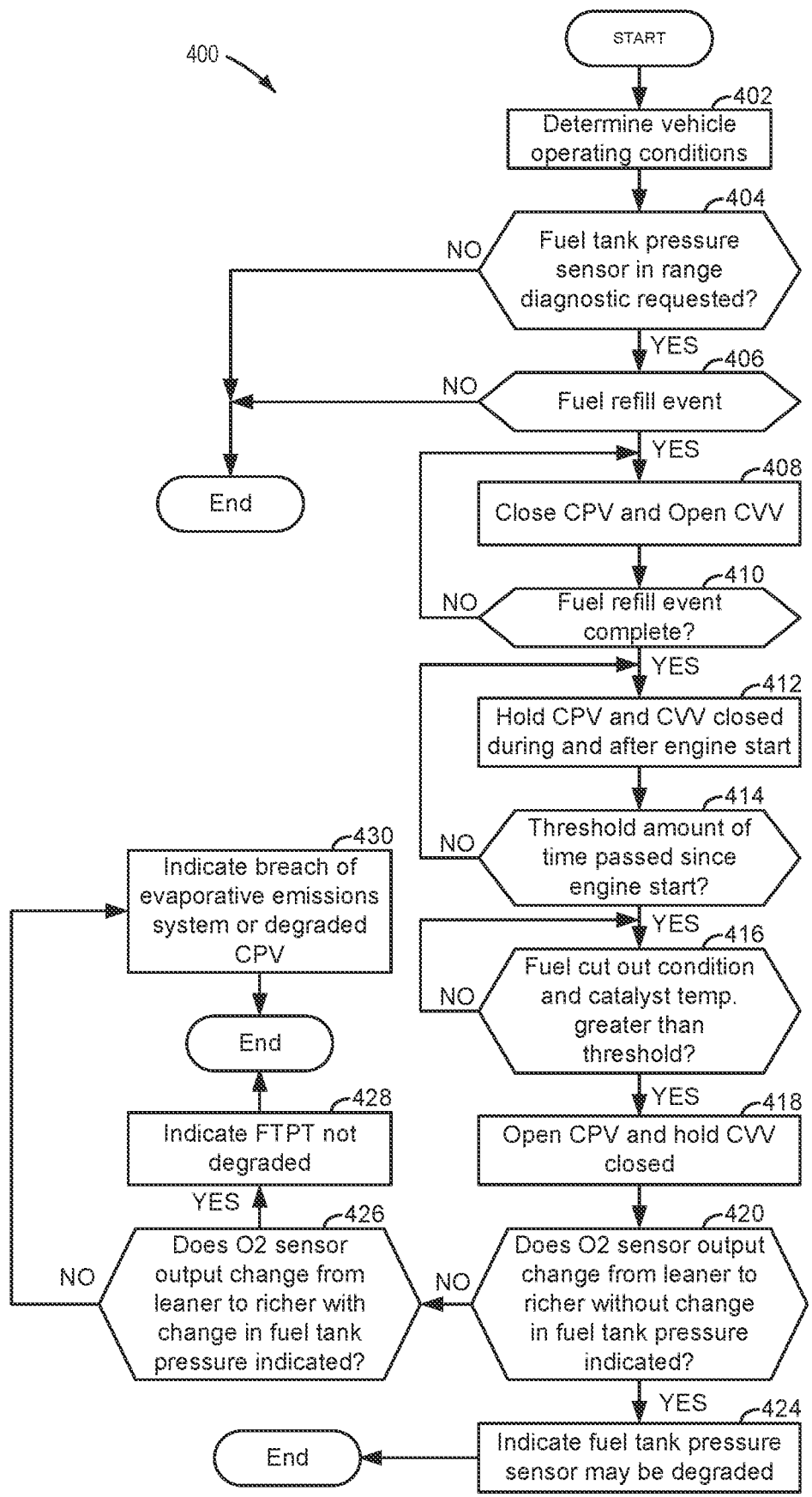
FIG. 4 shows an example method for diagnosing operation of a fuel tank pressure sensor.

The following description relates to systems and methods for diagnosing operation of a fuel tank pressure sensor of a vehicle. The vehicle may include an internal combustion engine (e.g., engine) as shown in FIG. 1. The vehicle may also include an evaporative emissions system as shown in FIG. 2. The vehicle and evaporative emissions system may operate as shown in the sequence of FIG. 3. The vehicle may include a method for diagnosing operation of a fuel tank pressure sensor as shown in FIG. 4.

Referring now to FIG. 1, an engine of a vehicle is shown. In this example, the vehicle motive power source is a spark ignition internal combustion engine. However, the vehicle motive power source may be a diesel engine, a turbine, or an electric machine.

FIG. 1 is schematic diagram showing one cylinder of a multi-cylinder engine 130 in an engine system 100 is shown. Engine 130 may be controlled at least partially by a control system including a controller 12. Engine 130 is shown included in vehicle 5.

A combustion chamber 132 of the engine 130 may include a cylinder 133 formed by cylinder walls 134 with a piston 136 positioned therein. The piston 136 may be coupled to a crankshaft 140 so that reciprocating motion of the piston is translated into rotational motion of the crankshaft. The crankshaft 140 may be coupled to at least one drive wheel of a vehicle via an intermediate transmission system. Further, a starter motor (not shown) may be coupled to the crankshaft 140 via a flywheel to enable a starting operation of the engine 130.

Combustion chamber 132 may receive intake air from an intake manifold 144 via an intake passage 142 and may exhaust combustion gases via an exhaust passage 148. The intake manifold 144 and the exhaust passage 148 can selectively communicate with the combustion chamber 132 via respective intake valve 152 and exhaust valve 154. In some examples, the combustion chamber 132 may include two or more intake valves and/or two or more exhaust valves.

In this example, the intake valve 152 and exhaust valve 154 may be controlled by cam actuation via respective cam actuation systems 151 and 153. The cam actuation systems 151 and 153 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 152 and exhaust valve 154 may be determined by position sensors 155 and 157, respectively. In alternative examples, the intake valve 152 and/or exhaust valve 154 may be controlled by electric valve actuation. For example, the cylinder 133 may alternatively include an intake valve controlled via electric valve actuation and an exhaust valve controlled via cam actuation including CPS and/or VCT systems.

A fuel injector 169 is shown coupled directly to combustion chamber 132 for injecting fuel directly therein in proportion to the pulse width of a signal received from the controller 12. In this manner, the fuel injector 169 provides what is known as direct injection of fuel into the combustion chamber 132. The fuel injector may be mounted in the side of the combustion chamber or in the top of the combustion chamber, for example. Fuel may be delivered to the fuel injector 169 by a fuel system (not shown) including a fuel tank, a fuel pump, and a fuel rail. In some examples, the combustion chamber 132 may alternatively or additionally include a fuel injector arranged in the intake manifold 144 in a configuration that provides what is known as port injection of fuel into the intake port upstream of the combustion chamber 132.

Spark is provided to combustion chamber 132 via spark plug 166. The ignition system may further comprise an ignition coil (not shown) for increasing voltage supplied to spark plug 166. In other examples, such as a diesel, spark plug 166 may be omitted.

The intake passage 142 may include a throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 132 among other engine cylinders. The position of the throttle plate 164 may be provided to the controller 12 by a throttle position signal. The intake passage 142 may include a mass air flow sensor 120 and a manifold air pressure sensor 122 for sensing an amount of air entering engine 130.

An exhaust gas sensor 127 is shown coupled to the exhaust passage 148 upstream of an emission control device 170 according to a direction of exhaust flow. The sensor 127 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 127 is a UEGO configured to provide output, such as a voltage signal, that is proportional to the amount of oxygen present in the exhaust. A second oxygen sensor 125 may be configured to sense oxygen and used to determine an air-fuel ratio in intake manifold 144. Controller 12 converts oxygen sensor output into an air-fuel ratio via an oxygen sensor transfer function.

The emission control device 170 is shown arranged along the exhaust passage 148 downstream of the exhaust gas sensor 127. The device 170 may be a three way catalyst (TWC), $NO_x$ trap, various other emission control devices, or combinations thereof. In some examples, during operation of the engine 130, the emission control device 170 may be periodically reset by operating at least one cylinder of the engine within a particular air-fuel ratio.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 130, in addition to those signals previously discussed, including measurement of inducted mass air flow (MAF) from the mass air flow sensor 120; a position sensor 194 coupled to a driver demand pedal 190 for sensing force applied by human driver 192; brake pedal position from brake pedal position sensor 180 when human driver 192 applies brake pedal 182; engine coolant temperature (ECT) from a temperature sensor 123 coupled to a cooling sleeve 114; an engine position signal from a crankshaft position sensor 118 (or other type) sensing a position of crankshaft 140; throttle position from a throttle position sensor 165; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 144. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing at least portions of the methods described below as well as other variants that are anticipated but not specifically listed. Thus, controller 12 may operate actuators to change operation of engine 130. In addition, controller 12 may post data, messages, and status information to human/machine interface 113 (e.g., a touch screen display, heads-up display, light, etc.).

During operation, each cylinder within engine 130 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 132 via intake manifold 144, and piston 136 moves to the bottom of the cylinder so as to increase the volume within combustion chamber 132. The position at which piston 136 is near the bottom of the cylinder and at the end of its stroke (e.g. when combustion chamber 132 is at its largest volume) is typically referred to by those of skill in the art as bottom dead center (BDC).

During the compression stroke, intake valve 152 and exhaust valve 154 are closed. Piston 136 moves toward the cylinder head so as to compress the air within combustion chamber 132. The point at which piston 136 is at the end of its stroke and closest to the cylinder head (e.g. when combustion chamber 132 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 166, resulting in combustion.

During the expansion stroke, the expanding gases push piston 136 back to BDC. Crankshaft 140 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc.

Referring now to FIG. 2, a block diagram of an example evaporative emissions system 200 is shown. Evaporative emissions system 200 includes a canister purge valve 202, a carbon filled canister 204, a canister vent valve 206, a fuel tank pressure sensor 208, a carbon canister temperature sensor 210, a locking fuel tank cap 230, a first vent valve 212, a second vent valve 216, and a fuel limit vent valve 214. Carbon filled canister 204 may include activated carbon 211 to store fuel vapors. First vent valve 212 and second vent valve 216 may also be described as first grade vent valve 212 and second grade vent valve 216. The first vent valve 212, the fuel limit valve, and the second vent valve may be fluidically coupled to the carbon containing canister 204 via a conduit 233.

Fuel tank 220 and first vent valve 212 may be arranged in vehicle 5 closer to a front end 13 of a vehicle 5 than second vent valve 216. Further, second vent valve 216 may be arranged in vehicle 5 closer to rear end 11 of vehicle 5 than first vent valve 212. Canister purge valve 202 may selectively allow fluidic communication between carbon canister 204 and intake manifold 144 via conduit 219. Canister vent valve 206 may selectively allow fluidic communication between carbon canister 204 and atmosphere via conduit 221. Optional fuel vapor blocking valve 209 may selectively allow fuel vapors to flow from fuel tank 220 to carbon filled canister 204.

Fuel 224 in fuel tank 220 may generate vapors that migrate to vapor space 226 within fuel tank 220 when fuel 224 is exposed to warm temperatures and/or agitation. Fuel vapors may migrate from vapor space 226 toward atmosphere when either or both of vent valves 212 and 216 are closed. Fuel limit vent valve 214 may close during filling of fuel tank 220 to prevent overfilling of fuel tank 220. Fuel may flow from locking fuel cap 230 to fuel tank 220 via filler neck pipe 231. Locking fuel cap 230 may be locked and unlocked via controller 12. Fuel level sensor 245 may provide an indication of a fuel level in fuel tank 220.

Thus, the system of FIGS. 1 and 2 provides for a vehicle system, comprising: a vehicle including an internal combustion engine and a fuel tank, the internal combustion engine including an oxygen sensor, the fuel tank including a pressure sensor configured to monitor pressure in the fuel tank; and a controller in the vehicle, the controller including executable instructions stored in non-transitory memory that cause the controller to evaluate operation of the pressure sensor based on output of the oxygen sensor. In a first example, the vehicle system further comprises additional instructions to rotate the internal combustion engine without fueling the internal combustion engine while evaluating the pressure sensor. In a second example that may include the first example, the vehicle system includes where the internal combustion engine is rotated while in a fuel cut off mode. In a third example that may include one or more of the first and second examples, the vehicle system further comprises a canister purge valve and additional instructions to open, or hold open, the canister purge valve while the internal combustion engine is rotated in the fuel cut off mode. In a fourth example that may include one or more of the first through third examples, the vehicle system further comprises a canister vent valve and additional instructions to close, or hold closed, the canister vent valve while the internal combustion engine is rotated in the fuel cut off mode. In a fifth example that may include one or more of the first through fourth examples, the vehicle system further comprises additional instructions to indicate whether the pressure sensor is degraded or is not degraded. In a sixth example that may include one or more of the first through fifth examples, the vehicle system further comprises additional instructions to trap fuel vapors in the fuel tank after refilling the fuel tank in response to a request to evaluate the pressure sensor.

Referring now to FIG. 3, an example sequence for diagnosing operation of a fuel tank pressure sensor is shown. The sequence of FIG. 3 may be provided by the system of FIGS. 1 and 2 in cooperation with the method of FIG. 4. Vertical markers at times t0-t7 represent times of interest during the sequence. All of the plots occur at a same time and same vehicle operating conditions.

The first plot from the top of FIG. 3 is a plot of a fuel tank pressure sensor (FTPS) diagnostic state versus time. The vertical axis represents the FTPS operating state. The FTPS diagnostic is activated or being performed when trace 302 is at a higher level near the vertical axis arrow. The FTPS diagnostic is not activated or being performed when trace 302 is at a lower level near the horizontal axis. The horizontal axis represents time and time increases from the left side of the plot to the right side of the plot. Trace 302 represents the FTPS state.

The second plot from the top of FIG. 3 is a plot of FTPS output versus time. The vertical axis represents the FTPS output and FTPS output increases in the direction of the vertical axis arrow. The horizontal axis represents time and time increases from the left side of the plot to the right side of the plot. Trace 304 represents the FTPS output.

The third plot from the top of FIG. 3 is a plot of canister purge valve (CPV) state versus time. The vertical axis represents the CPV state and the CPV valve is open when trace 306 is at a higher level near the vertical axis arrow. The CPV is fully closed when trace 306 is near the horizontal axis. The horizontal axis represents time and time increases from the left side of the plot to the right side of the plot. Trace 306 represents the CPV state.

The fourth plot from the top of FIG. 3 is a plot of canister vent valve (CVV) state versus time. The vertical axis represents the CVV state and the CVV valve is open when trace 308 is at a higher level near the vertical axis arrow. The CVV is fully closed when trace 308 is near the horizontal axis. The horizontal axis represents time and time increases from the left side of the plot to the right side of the plot. Trace 308 represents the CVV state.

The fifth plot from the top of FIG. 3 is a plot of fuel cut out state for the engine (e.g., the engine is rotating without injecting fuel to the engine) versus time. The vertical axis represents the engine fuel cut out state and the engine is in fuel cut out when trace 310 is at a higher level near the vertical axis arrow. The engine is not in fuel cut out when trace 310 is near the horizontal axis. The horizontal axis represents time and time increases from the left side of the plot to the right side of the plot. Trace 310 represents the engine fuel cut out state.

The sixth plot from the top of FIG. 3 is a plot of vehicle fuel refilling state versus time. The vertical axis represents the vehicle fuel refilling state and the vehicle is being refilled with fuel when trace 312 is at a higher level near the vertical axis arrow. The vehicle is not being refilled with fuel when trace 312 is near the horizontal axis. The horizontal axis represents time and time increases from the left side of the plot to the right side of the plot. Trace 312 represents the vehicle fuel refilling state.

The seventh plot from the top of FIG. 3 is a plot of engine operating state versus time. The vertical axis represents the engine operating state and the engine may be rotating when trace 314 is at a higher level near the level of the vertical axis arrow. The engine is not rotating when trace 314 is near the level of the horizontal axis. The horizontal axis represents time and time increases from the left side of the plot to the right side of the plot. Trace 314 represents the engine operating state.

The eighth plot from the top of FIG. 3 is a plot of an air-fuel ratio in the engine's exhaust manifold as determined from output of an oxygen sensor versus time. The vertical axis represents the engine air-fuel ratio and the air-fuel ratio increases (e.g., becomes leaner) in the direction of the vertical axis arrow. The horizontal axis represents time and time increases from the left side of the plot to the right side of the plot. Trace 316 represents the air-fuel ratio. Horizontal line 350 represents a stoichiometric air-fuel ratio. The air-fuel ratio is rich when it is below horizontal line 350.

The ninth plot from the top of FIG. 3 is a plot of fuel tank pressure sensor (FTPS) degradation state versus time. The vertical axis represents the FTPS degradation state and the FTPS is determined to be degraded when trace 318 is at a higher level near the level of the vertical axis arrow. The FTPS is determined to not be degraded when trace 318 is near the level of the horizontal axis. The horizontal axis represents time and time increases from the left side of the plot to the right side of the plot. Trace 318 represents the degradation state of the FTPS.

At time t0, the engine is rotating and an FTPS diagnostic is not requested. The FTPS output is in an expected range and the canister purge valve is open so that fuel vapor may flow from the carbon canister (not shown) to the engine (not shown). The canister vent valve is also open and the engine is not in a fuel cut out mode (e.g., the engine is receiving and combusting fuel). The vehicle is not being refueled and the engine air-fuel ratio is near stoichiometric. The FTPS is not indicated as being degraded.

At time t1, a fuel tank pressure sensor diagnostic is requested. The fuel tank pressure sensor diagnostic may be requested based on output of the fuel tank pressure sensor or based on other vehicle operating conditions. The fuel tank pressure sensor output is unchanged and the canister purge valve remains open. The canister vent valve also remains open and the engine is not operating in a fuel cut out mode. The vehicle is not being fueled and the engine is rotating and combusting a stoichiometric air-fuel ratio. Fuel tank pressure sensor degradation is not indicated.

At time t2, the engine is stopped (e.g., not rotating and combusting fuel) and the canister purge valve is closed. The fuel tank pressure sensor output is unchanged and the canister vent valve remains open. The engine is not in a fuel cut out mode and the vehicle is not being filled with fuel. The engine air-fuel ratio is indicated as lean since fuel is not being injected to the engine. The fuel tank pressure sensor is not indicated as being degraded.

At time t3, the engine remains stopped and the vehicle begins to be filled with fuel. The fuel tank pressure sensor output is unchanged and the canister purge valve remains closed. The canister vent valve remains open so that fuel vapors may enter the carbon filled canister during vehicle refueling. The engine is not in a fuel cut out mode and the engine air-fuel ratio is indicated as lean. The fuel tank pressure sensor is not indicated as being degraded.

At time t4, fueling of the vehicle ceases and the canister vent valve is closed so that fuel vapors may build within the fuel tank. The fuel tank pressure sensor diagnostic remains asserted and the fuel tank pressure sensor output is unchanged. The canister purge valve is held closed so that fuel vapors may build in the fuel tank. The engine is not operating in a fuel cut out mode and the engine air-fuel ratio remains lean. The fuel tank pressure sensor is not indicated as being degraded.

At time t5, the engine is restarted and the engine air-fuel ratio begins to transition back to a stoichiometric level. The fuel tank pressure sensor diagnostic is still activated, and with the fuel tank being refilled with fuel, there is now opportunity to compare fuel tank pressure sensor output against oxygen sensor output because vapors may be expected in the fuel tank. The oxygen sensor output may indicate that there was sufficient pressure in the fuel tank to drive fuel vapors into the engine. The fuel tank pressure sensor output is unchanged and the canister purge valve is held closed. The canister vent valve is also held closed and the engine is not operated in a fuel cut out mode. The vehicle is not being filled with fuel and the fuel pressure sensor is not indicated as being degraded.

At time t6, the engine enters a fuel cut out mode in response to vehicle operating conditions (e.g., low driver demand and vehicle speed being greater than a threshold speed). The fuel pressure diagnostic remains asserted and the fuel pressure sensor output is unchanged. The canister vent valve remains closed, but the canister purge valve is opened shortly after time t6 so that pressure in the fuel tank from fuel vapors may drive the fuel vapors into the engine intake manifold. In some examples, the engine's throttle may be opened so that vacuum in the engine intake manifold may be minimized so that pressure in the fuel tank may be the primary motive force of fuel vapors into the rotating engine. The engine air-fuel ratio moves from stoichiometric to lean and the engine rotates without combusting fuel. The vehicle is not being filled with fuel and the fuel pressure sensor is not indicated as being degraded.

Between time t6 and time t7, the fuel tank pressure sensor diagnostic continues and the output of the fuel pressure sensor is unchanged and in an expected range. Because there is pressure in the fuel tank, fuel vapors may be driven to the engine intake manifold and then pumped to the oxygen sensor in the exhaust manifold. The air-fuel ratio changes from lean to rich in response to the fuel vapors without the output of the fuel pressure sensor changing. The rich air-fuel ratio provides an indication that fuel vapors were driven from the fuel tank, which may be indicative of a pressure drop in the fuel tank even though the fuel tank pressure sensor failed to provide such indication. As a result, degradation of the fuel tank pressure sensor is indicated. The engine continues to operate in fuel cut out mode and the canister purge valve is closed well before the engine exits fuel cut out mode so that fuel vapors may be evacuated from the engine intake manifold, thereby reducing a possibility of engine misfire when combustion is reactivated in the engine.

At time t7, the engine exits fuel cut out mode and the engine air fuel ratio is returned to a stoichiometric level. The output of the fuel tank pressure sensor is unchanged and the canister purge valve is held closed. The canister vent valve is shown closed, but it may be opened in some examples. The vehicle is not being refilled with fuel and the fuel tank pressure sensor continues to be identified as being degraded. The fuel tank pressure sensor diagnostic ends a short time later.

In this way, a vehicle's fuel tank pressure sensor may be diagnosed or evaluated. The evaluation may consider the state of the output of the fuel tank pressure sensor as well as output of an oxygen sensor. Thus, output of the oxygen sensor changing from indicating a leaner air-fuel mixture to indicating a richer air-fuel mixture may be a basis for confirming whether or not output of the fuel tank pressure sensor may be directionally correct.

Referring now to FIG. 4, an example method 400 for diagnosing operation and status of a fuel tank pressure sensor is shown. At least portions of method 400 may be included in and cooperate with a system as shown in FIGS. 1 and 2 as executable instructions stored in non-transitory memory. The method of FIG. 4 may cause the controller to operate the actuators in the real world and receive data and signals from sensors described herein when the method is realized as executable instructions stored in controller memory.

At 402, method 400 determines vehicle operating conditions. Vehicle operating conditions may include but are not limited vehicle fuel refilling status, fuel tank pressure, ambient temperature, ambient pressure, a total distance travelled by the vehicle, engine temperature, ambient temperature, vehicle speed, a fuel level in a fuel tank, vehicle position, an amount of fuel vapor stored in a carbon filled canister, and engine state (e.g., on/off). Method 400 proceeds to 404.

At 404, method 400 judges whether or not a fuel tank pressure sensor in range diagnostic is requested. In one example, a fuel tank pressure sensor in range diagnostic may be performed in response to one or more of the vehicle being driven a predetermined distance, a predetermined amount of vehicle operation time passing, output of a fuel tank pressure sensor not changing within a predetermined amount of time, a manual request to perform a diagnostic of the fuel tank pressure sensor, etc. If method 400 judge that conditions are present for diagnosing a fuel tank pressure sensor, the answer is yes and method 400 proceeds to 406. Otherwise, the answer is no and method 400 proceeds to exit.

At 406, method 400 judges if a fuel refilling event is in progress or has recently occurred. Alternatively, or in addition, method 400 may judge if an amount of fuel in the fuel tank is greater than a threshold amount (e.g., the fuel tank is at least three fourths full). If method 400 judges that a fuel refilling event (e.g., fuel is added to the vehicle's fuel tank) is in progress or has recently occurred or if the fuel tank is filled with fuel above a threshold amount, the answer is yes and method 400 proceeds to 408. Otherwise, the answer is no and method 400 proceeds to exit.

At 408, method 400 closes the canister purge valve (CPV) and opens the canister vent valve (CVV) if the fuel tank is being filled. If the fuel tank is not being refilled, method 400 closes the CPV and the CVV. If the evaporative emissions system includes a fuel vapor blocking valve (FVBV), method 400 may open the FVBV if the fuel tank is being refilled. Method 400 proceeds to 410.

At 410, method 400 judges if a fuel refilling event is complete. In addition, method 400 may judge if the fuel tank is not being refilled and a fuel level in the fuel tank is greater than a threshold level. If either condition is true, the answer is yes and method 400 proceeds to 412. Otherwise, method 400 returns to 408.

At 412, method 400 holds the CPV and the CVV closed after fuel refilling is complete, if a fuel refilling event has occurred. If a fuel refilling event has not occurred and if a fuel level in the fuel tank is greater than a threshold level, then method 400 holds the CPV and CVV closed so that fuel vapors may accumulate in the fuel tank, thereby increasing pressure within the fuel tank. Method 400 proceeds to 414.

At 414, method 400 judges if a threshold amount of time has passed since the vehicle's engine was most recently started. If so, the answer is yes and method 400 proceeds to 416. Otherwise, the answer is no and method 400 returns to 412.

At 416, method 400 may judge if the engine is in a fuel cut out mode (e.g., rotating without being fueled while driver demand torque is less than a threshold and while vehicle speed is greater than a threshold speed) while a catalyst temperature is greater than a threshold temperature. These conditions may allow fuel vapors to be sensed in the exhaust system and prevent misfire while the engine is rotating. Alternatively, or in addition, method 400 may judge if the vehicle's engine has been stopped while the vehicle is stopped. These conditions may allow fuel vapors to be detected in the engine's intake manifold. If one of these conditions is true, the answer is yes and method 400 may proceed to 418. Otherwise, the answer is no and method 400 remains at 416.

Method 400 may also estimate an amount of time that an engine will be in a fuel cut out mode based on traffic conditions, road attributes (e.g., road grade), and past driving history of the vehicle that may include records of the durations of the engine operating in a fuel cut out mode. Method 400 may require that the estimated duration of the engine operating in fuel cut out mode exceed a threshold amount of time before method 400 proceeds to 418. By requiring that the estimated duration of the engine operating in fuel cut out mode exceed a threshold amount of time, it may be possible to ensure that the engine's intake manifold is evacuated of fuel vapors before the engine is restarted to prevent misfires.

In some examples, method 400 may require that the engine is rotating and combusting fuel while catalyst temperature is greater than a threshold temperature and driver demand is substantially constant and greater than a threshold (e.g., changing by more than 5% in less than 5 seconds). If these conditions are met, method 400 may slowly ramp opening of the CPV valve at 418 to reduce a possibility of engine misfire while engine load is high so that vacuum in the engine intake manifold is low. During such conditions, pressure in the fuel tank may be the dominate motive force to move fuel vapors from the fuel tank to the engine.

At 418, method 400 opens the CPV and holds the CVV closed. By opening the CPV, pressure in the fuel tank may drive fuel vapors from the fuel tank into the engine. If the engine is in fuel cut out mode, the engine may pump the fuel vapors to the exhaust system where they may be sensed via an oxygen sensor. In some examples, the engine throttle (e.g., 162) may be fully opened while the engine is in the fuel cut out mode so that fuel vapors may be driven more by pressure in the fuel tank than by vacuum in the engine intake manifold.

On the other hand, if the engine is stopped (e.g., not rotating) and vehicle is stopped, the throttle may be fully closed and an air-fuel ratio may be sensed in the engine's intake manifold to determine whether or not pressure in the fuel tank provided motive force to move fuel vapors into the engine's intake manifold. Method 400 may also open the FVBV if present. Method 400 proceeds to 420.

At 420, method 400 judges if the oxygen sensor in the exhaust manifold has changed from a leaner state to a richer state if the engine is in a fuel cut out mode, and method 400 judges if the output of the fuel tank pressure sensor is substantially unchanged (e.g., changes by less than 5% of reading) while the CPV is open. Method 400 may wait a predetermined amount of time for these conditions to occur. For example, method 400 may judge if the oxygen sensor has changed state from a first leaner air-fuel ration (e.g., 17:1) to a richer air-fuel ratio (e.g., 13:1). Further, method 400 judges if the output of the fuel tank pressure sensor output has changed by less than a threshold amount. If both conditions are true, the answer is yes and method 400 proceeds to 424. Alternatively, method 400 may judge if the oxygen sensor in the intake manifold has changed from a leaner state to a richer state if the engine and the vehicle are stopped, and method 400 judges if the output of the fuel tank pressure sensor is substantially unchanged (e.g., changes by less than 5% of reading) while the CPV is open. If both conditions are true, the answer is yes and method 400 proceeds to 424.

At 424, method 400 indicates degradation of the fuel tank pressure sensor. Method 400 may provide a visual indication via a human/machine interface. In addition, method 400 may also prevent or suspend other evaporative emissions system diagnostics. Further, method 400 may delay opening of a locking fuel filler cap or port (e.g., 230 of FIG. 2) so that there may be time for pressure in a fuel tank to decay before the fuel refill port is opened, thereby reducing fuel vapor flow from the fuel refilling port. For example, during conditions when the fuel tank pressure sensor is working as expected, the canister vent valve may be opened prior to allowing the fuel refill port to open after a vehicle is stopped. The fuel tank pressure sensor may indicate that pressure in the fuel tank has dropped to a threshold pressure in 1.5 seconds after the canister purge valve was opened and the vehicle stopped, at which time the fuel filler cap may be unlocked. Thus, the fuel filler cap may be opened soon when a fuel tank fuel sensor is not degraded. However, pressure in the fuel tank may not be known when a fuel tank fuel sensor is degraded. Therefore, unlocking of the fuel filler cap may be delayed so that the fuel tank may reach a lower pressure before the fuel filler cap is unlocked (e.g., 15 seconds after the vehicle is stopped and/or the CVV is opened). Method 400 may also close the CPV. Method 400 proceeds to exit.

At 426, method 400 judges if the oxygen sensor in the exhaust manifold has changed from a leaner state to a richer state if the engine is in a fuel cut out mode, and method 400 judges if the output of the fuel tank pressure sensor is substantially changed (e.g., changes by more than 5% of reading) while the CPV is open. Method 400 may wait a predetermined amount of time for these conditions to occur. For example, method 400 may judge if the oxygen sensor has changed state from a first leaner air-fuel ration (e.g., 17:1) to a richer air-fuel ratio (e.g., 13:1). Further, method 400 judges if the output of the fuel tank pressure sensor output has changed by more than a threshold amount. If both conditions are true, the answer is yes and method 400 proceeds to 428. Alternatively, method 400 may judge if the oxygen sensor in the intake manifold has changed from a leaner state to a richer state if the engine and the vehicle are stopped, and method 400 judges if the output of the fuel tank pressure sensor is substantially changed (e.g., changes by more than 5% of reading) while the CPV is open. If both conditions are true, the answer is yes and method 400 proceeds to 428.

At 428, method 400 indicates that the fuel tank pressure sensor is not degraded. The not degraded evaluation is based on the oxygen sensor indicating fuel vapors enter the engine while the fuel tank pressure sensor indicates falling pressure in the fuel tank. These two conditions may be indicative of a non-degraded fuel tank pressure sensor. Method 400 may also close the CPV. Method 400 proceeds to exit.

At 430, method 400 may indicate a breach of or within the evaporative emissions system and/or a degraded CPV valve. If the oxygen sensor does not indicate fuel vapors have flowed into the engine, then the CPV valve may not be opening or there may be a large breach of the evaporative emissions system. Method 400 may provide an indication of a degraded CPV and/or a breach of the evaporative emissions system. Method 400 may also close the CPV. Method 400 proceeds to exit.

In this way, diagnostics may be performed for fuel tank pressure sensor. The diagnostics may provide confirmed operation of the fuel tank pressure sensor that is backed by output of an oxygen sensor. Thus, an oxygen sensor may be a basis for verifying operation of a fuel tank pressure sensor.

Thus, method 400 provides for a method for diagnosing a fuel tank pressure sensor, comprising: indicating degradation of the fuel tank pressure sensor via a controller in response to output of an oxygen sensor changing while an output of the fuel tank pressure sensor is substantially unchanged; and adjusting operation of an evaporative emissions system when indicating degradation of the fuel tank pressure sensor. In a first example, the method includes where adjusting operation of the evaporative emissions system includes delaying permission to open a fuel filling port of a vehicle. In a second example that may include the first example, the method includes where adjusting operation of the evaporative emissions system includes suspending one or more evaporative emissions system diagnostics. In a third example that may include one or more of the first and second examples, the method includes where degradation of the fuel tank pressure sensor is indicated in response to output of the oxygen sensor changing to indicate a rich condition in an exhaust manifold. In a fourth example that may include one or more of the first through third examples, the method includes where degradation of the fuel tank pressure sensor is indicated in response to output of the oxygen sensor changing to indicate a rich condition in an intake manifold. In a fifth example that may include one or more of the first through fourth examples, the method includes where the oxygen sensor is positioned to sense oxygen in an exhaust manifold of an engine, and further comprising: rotating the engine without fueling the engine in response to a request to diagnose the fuel tank pressure sensor. In a sixth example that may include one or more of the first through fifth examples, the method includes where the oxygen sensor is positioned to sense oxygen in an intake manifold of an engine. In a seventh example that may include one or more of the first through sixth examples, the method further comprises opening a canister purge valve in response to a request to diagnose the fuel tank pressure sensor.

Method 400 also provides for a method for diagnosing a fuel tank pressure sensor, comprising: closing a canister purge valve and a canister vent valve via a controller to increase pressure in a fuel tank in response to a request to diagnose a fuel tank pressure sensor; opening the canister purge valve while rotating an engine unfueled via the controller; and indicating degradation of the fuel tank pressure sensor via the controller in response to an output of the fuel tank pressure sensor being substantially unchanged while an output of an oxygen sensor changes from a first state to a second state when rotating the engine unfueled. In a first example, the method includes where the second state indicates a richer exhaust mixture than the first state. In a second example that may include the first example, the method further comprises not indicating degradation of the fuel tank pressure sensor in response to the output of the fuel tank pressure sensor changing by more than a threshold amount while the output of the oxygen sensor changes from the first state to the second state when rotating the engine unfueled. In a third example that may include the first and second, the method further comprises not indicating degradation of the fuel tank pressure sensor in response to the output of the fuel tank pressure sensor being substantially unchanged while the output of the oxygen sensor does not substantially change when rotating the engine unfueled. In a third example that may include one or more of the first through third examples, the method includes where the canister purge valve and the canister vent valve are closed after a fuel tank is at least partially refilled and in response to a request to diagnose the fuel tank pressure sensor.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
   a vehicle including an internal combustion engine and a fuel tank, the internal combustion engine including an oxygen sensor, the fuel tank including a pressure sensor configured to monitor pressure in the fuel tank; and
   a controller in the vehicle, the controller including executable instructions stored in non-transitory memory that cause the controller to evaluate operation of the pressure sensor based on output of the oxygen sensor.

2. The vehicle system of claim 1, further comprising additional instructions to rotate the internal combustion engine without fueling the internal combustion engine while evaluating the pressure sensor.

3. The vehicle system of claim 2, where the internal combustion engine is rotated while in a fuel cut off mode.

4. The vehicle system of claim 3, further comprising a canister purge valve and additional instructions to open, or hold open, the canister purge valve while the internal combustion engine is rotated in the fuel cut off mode.

5. The vehicle system of claim 4, further comprising a canister vent valve and additional instructions to close, or hold closed, the canister vent valve while the internal combustion engine is rotated in the fuel cut off mode.

6. The vehicle system of claim 5, further comprising additional instructions to indicate whether the pressure sensor is degraded or is not degraded.

7. The vehicle system of claim 1, further comprising additional instructions to trap fuel vapors in the fuel tank after refilling the fuel tank in response to a request to evaluate the pressure sensor.

8. A method for diagnosing a fuel tank pressure sensor, comprising:
   indicating degradation of the fuel tank pressure sensor via a controller in response to output of an oxygen sensor changing while an output of the fuel tank pressure sensor changes by less than 5%; and
   adjusting operation of an evaporative emissions system when indicating degradation of the fuel tank pressure sensor.

9. The method of claim 8, where adjusting operation of the evaporative emissions system includes delaying permission to open a fuel filling port of a vehicle.

10. The method of claim 8, where adjusting operation of the evaporative emissions system includes suspending one or more evaporative emissions system diagnostics.

11. The method of claim 8, where degradation of the fuel tank pressure sensor is indicated in response to output of the oxygen sensor changing to indicate a rich condition in an exhaust manifold.

12. The method of claim 8, where degradation of the fuel tank pressure sensor is indicated in response to output of the oxygen sensor changing to indicate a rich condition in an intake manifold.

13. The method of claim 8, where the oxygen sensor is positioned to sense oxygen in an exhaust manifold of an engine, and further comprising:

rotating the engine without fueling the engine in response to a request to diagnose the fuel tank pressure sensor.

14. The method of claim 8, where the oxygen sensor is positioned to sense oxygen in an intake manifold of an engine.

15. The method of claim 8, further comprising opening a canister purge valve in response to a request to diagnose the fuel tank pressure sensor.

16. A method for diagnosing a fuel tank pressure sensor, comprising:
   closing a canister purge valve and a canister vent valve via a controller to increase pressure in a fuel tank in response to a request to diagnose the fuel tank pressure sensor;
   opening the canister purge valve while rotating an engine unfueled via the controller; and
   indicating degradation of the fuel tank pressure sensor via the controller in response to an output of the fuel tank pressure sensor changing less than 5% while an output of an oxygen sensor changes from a first state to a second state when rotating the engine unfueled.

17. The method of claim 16, where the second state indicates a richer exhaust mixture than the first state.

18. The method of claim 16, further comprising not indicating degradation of the fuel tank pressure sensor in response to the output of the fuel tank pressure sensor changing by more than a threshold amount while the output of the oxygen sensor changes from the first state to the second state when rotating the engine unfueled.

19. The method of claim 18, further comprising not indicating degradation of the fuel tank pressure sensor in response to the output of the fuel tank pressure sensor changing by less than 5% while the output of the oxygen sensor does not change by more than 5% when rotating the engine unfueled.

20. The method of claim 16, where the canister purge valve and the canister vent valve are closed after the fuel tank is at least partially refilled and in response to the request to diagnose the fuel tank pressure sensor.

* * * * *